(12) United States Patent
Gero

(10) Patent No.: US 9,112,826 B2
(45) Date of Patent: Aug. 18, 2015

(54) DATA DIFFERENCING ACROSS PEERS IN AN OVERLAY NETWORK

(71) Applicant: Akamai Technologies, Inc., Cambridge, MA (US)

(72) Inventor: Charles E. Gero, Quincy, MA (US)

(73) Assignee: Akamai Technologies, Inc., Cambridge, MA (US)

(*) Notice: Subject to any disclaimer, the term of this patent is extended or adjusted under 35 U.S.C. 154(b) by 268 days.

(21) Appl. No.: 13/726,036

(22) Filed: Dec. 22, 2012

(65) Prior Publication Data
US 2013/0185387 A1     Jul. 18, 2013

Related U.S. Application Data

(60) Provisional application No. 61/579,672, filed on Dec. 23, 2011.

(51) Int. Cl.
| | | |
|---|---|---|
| *G06F 13/00* | (2006.01) | |
| *H04L 29/08* | (2006.01) | |
| *H04L 29/12* | (2006.01) | |

(52) U.S. Cl.
CPC .......... *H04L 67/02* (2013.01); *H04L 29/08792* (2013.01); *H04L 67/1095* (2013.01); *H04L 67/28* (2013.01); *H04L 67/2828* (2013.01); *H04L 61/1511* (2013.01)

(58) Field of Classification Search
CPC .............. H04L 29/08072; H04L 29/06; H04L 29/0809; H04L 29/08981; H04L 29/08792; H04L 61/1511; H04L 67/02; H04L 67/28; H04L 67/2828; G06Q 30/02
USPC .......................................................... 709/217
See application file for complete search history.

(56) References Cited

U.S. PATENT DOCUMENTS

| | | | |
|---|---|---|---|
| 6,108,703 | A | 8/2000 | Leighton et al. |
| 6,820,133 | B1 | 11/2004 | Grove et al. |
| 7,111,057 | B1 | 9/2006 | Sherman et al. |
| 7,240,100 | B1 | 7/2007 | Wein et al. |
| 7,376,716 | B2 | 5/2008 | Dilley et al. |
| 7,472,178 | B2 | 12/2008 | Lisiecki et al. |

(Continued)

OTHER PUBLICATIONS

PCT/US2012/071533, International Search Report and Written Opinion, Apr. 30, 2013.

(Continued)

*Primary Examiner* — Robert B Harrell
(74) *Attorney, Agent, or Firm* — David H. Judson

(57) ABSTRACT

A data differencing technique enables a response from a server to the request of a client to be composed of data differences from previous versions of the requested resource. To this end, data differencing-aware processes are positioned, one at or near the origin server (on the sending side) and the other at the edge closest to the end user (on the receiving side), and these processes maintain object dictionaries. The data differencing-aware processes each execute a compression and differencing engine. Whenever requested objects flow through the sending end, the engine replaces the object data with pointers into the object dictionary. On the receiving end of the connection, when the data arrives, the engine reassembles the data using the same object dictionary. The approach is used for version changes within a same host/path, using the data differencing-aware processes to compress data being sent from the sending peer to the receiving peer.

17 Claims, 4 Drawing Sheets

(56) References Cited

U.S. PATENT DOCUMENTS

| | | |
|---|---|---|
| 7,660,296 B2 | 2/2010 | Fletcher et al. |
| 8,121,991 B1* | 2/2012 | Gabber et al. ............... 707/695 |
| 2002/0188665 A1 | 12/2002 | Lash et al. |
| 2003/0105925 A1 | 6/2003 | Etoh et al. |
| 2003/0167257 A1* | 9/2003 | de Bonet ......................... 707/1 |
| 2004/0093419 A1 | 5/2004 | Weihl et al. |
| 2006/0031532 A1* | 2/2006 | Sanders ....................... 709/227 |
| 2006/0168510 A1* | 7/2006 | Bryar et al. ................... 715/511 |
| 2006/0253461 A1* | 11/2006 | de Bonet ........................ 707/10 |
| 2011/0154426 A1 | 6/2011 | Chen et al. |
| 2011/0161825 A1* | 6/2011 | Tierney et al. ................ 715/736 |
| 2011/0179341 A1 | 7/2011 | Clarke et al. |
| 2011/0213655 A1* | 9/2011 | Henkin et al. ............. 705/14.49 |
| 2011/0219057 A1 | 9/2011 | Scoda |

OTHER PUBLICATIONS

Mogul et al, "Delta encoding in HTTP," Internet RFC 3229, Jan. 2002.

Butler et al, "A Proposal for Shared Dictionary Compression over HTTP," Google, Inc., Sep. 8, 2008.

* cited by examiner

DATA DIFFERENCING ACROSS PEERS IN AN OVERLAY NETWORK

This application is based on and claims priority to Ser. No. 61/579,672, filed Dec. 23, 2011.

BACKGROUND

1. Technical Field

This application relates generally to data communication over a network.

2. Brief Description of the Related Art

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Data differencing is a known technology and method to leverage shared prior instances of a resource, also known as versions of data within a shared dictionary in compression terminology, between a server and a client; the process works by only sending the differences or changes that have occurred since those prior instance(s). Data differencing is related to compression, but is a slightly distinct concept. In particular, intuitively, a difference ("diff") is a form of compression. As long as the receiver has the same original file as a sender, that sender can give the receiver a diff instead of the entire new file. The diff in effect explains how to create the new file from the old. It is usually much smaller than the whole new file and thus is a form of compression. The diff between a first version of a document and a second version of that same document is the data difference; the data difference is the result of compression of the second version of a document using the first version of the document as a preset dictionary.

Many HTTP (Hypertext Transport Protocol) requests cause the retrieval of only slightly-modified instances of resources for which the requesting client already has a cache entry. For example, an origin server may publish a page of stock quotes for every company listed in the S&P 500. As time goes on and the quotes change, the overall page remains very similar. The names of the companies and their ticker symbols, CSS, images, and general HTML formatting probably remain unchanged from version to version. When the client requests an updated page, however, it will end up downloading the content in its entirety, even those items discussed above that do not differ from the data the client has already downloaded in prior versions. Because such modifying updates may be frequent and the modifications are often much smaller than the actual entity, the concept of "delta encoding"—by which the sending entity would transfer a minimal description of the changes, rather than an entire new instance of the resource—was proposed for HTTP. This concept, which is a way to make more efficient use of network bandwidth, was described in Internet Request for Comment (RFC) 3229.

Delta encoding per RFC 3229 does not address all issues that arise in the context of a distributed overlay network, such as a content delivery network. The largest concern is that the approach is based on the origin server doing the differencing. In the case of an overlay network, however, the service provider desires to provide services for customers so they do not have to add new software to their origin servers. Indeed, many customers will have vendor solutions that prohibit them from adding software or otherwise make it difficult. Therefore, an overlay provider will most likely have to do differencing in another server that sits in front of the origin server, primarily because the provider does not have all of the new version data present on disk or in-memory and against which a data difference might need to be calculated. The overlay network provider, in this context, receives data over the wire and has to wait orders of magnitude longer than a disk read or memory fetch to get all of it. In an RFC 3229-compliant solution, there is no way to start the differencing process on chunks and then send those down to the client while simultaneously reading new source chunks from the origin. Additionally, RFC 3229 relies upon e-tags and "last modified time" to reference a prior version document.

Another approach to this problem is provided by a technology called Google SDCH, which is another HTTP data difference mechanism. The main difference between it and RFC 3229 is that SDCH allows a dictionary to be something other than a previous version of the content. It also allows sharing of that dictionary between multiple resources. For example, if there are three HTML files that each contained a set of common phrases, the SDCH approach enables the creation of a single dictionary that can then be referenced by each HTML file. The user agent downloads that dictionary (D) separately; whenever it needs one of the HTML files, it then instructs the server to "give me HTML file X compressed with dictionary D." The server then sends the compressed file and the client de-compresses it using the shared dictionary. While this approach is efficient, there is no easy way to compute the shared dictionary.

While these known differencing approaches provide useful advantages, there remains a need to provide enhanced techniques for data differencing in the context of an overlay network.

BRIEF SUMMARY

An Internet infrastructure delivery platform (e.g., operated by a service provider) provides an overlay network. The overlay network includes endpoints between communication legs that may experience latency. One endpoint (a "sending" peer) is typically associated with or located near (or within) an origin server infrastructure. The other endpoint (a "receiving" peer) typically is located at or near an end user access network. A receiving peer is typically an edge server. A data differencing technique according to this disclosure enables responses from a server to the requests of a client to be composed (in whole or part) of data differences from previous versions of the requested resource that both the server and client have cached. To this end, and according to this disclosure, a pair of data differencing-aware processes are positioned, one at or near the origin server (on the sending side) and the other at the edge closest to the end user (on the receiving side), and these processes maintain object dictionaries between those two opposite ends. The data differencing-aware processes each execute a compression and differencing engine. Whenever requested objects flow through the sending end (from server to client), the engine replaces the object data with pointers into the object dictionary. On the other (the receiving) end of the connection, when the data arrives, the engine there reassembles the data using the same object dictionary.

The approach is used for version changes within a same host/path. The object dictionary on the client (receiving) side includes fingerprints corresponding to each version of an object that it has seen. The object dictionary on the server (sending) side includes fingerprints corresponding to each version of the object that it has delivered. The dictionary on the server side may have fingerprints that are not present in the client-side dictionary, and vice versa. The technique described herein works when at least some of the fingerprints are shared and in common between both the server and client. When a client request for a new version is received (and needs to be forwarded on toward the server side for handling), the data differencing-aware process associated with the client side includes in the forward request each of its fingerprints (corresponding to the versions it has). Then, when the data differencing-aware process on the server side receives those fingerprints, it checks its dictionary to determine which one of the fingerprints transmitted might be a match for the request. Typically, a "most recent" version will be selected, based on the assumption that the most recent version is likely to have the smallest number of changes (from prior version(s)). The use of the most recent version, however, is not a limitation. The data differencing-aware process on the server then fetches the requested new version from the origin, performs data differencing (of the requested new version with respect to the version selected as the match) to generate a difference (DIFF). The data differencing-aware process on the server generates a fingerprint for the requested new version and stores it in its dictionary (associated and along with the data itself). The data differencing-aware process on the sending side returns a response data stream with the compressed data (the DIFF), along with a response header that includes an identification of the fingerprint of the version that was used (out of the initial selection from the ones received from the client side) to do the differencing. The data differencing-aware process on the receiving side then uses the fingerprint to apply the DIFF against the corresponding version (which is already present on the client side) to re-create the requested version, which is then returned to the requesting client. The data differencing-aware process on the receiving side also generates a fingerprint of the requested new version and stores that new fingerprint in its own dictionary (associated and along with the data itself) so that the dictionaries remain synchronized.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
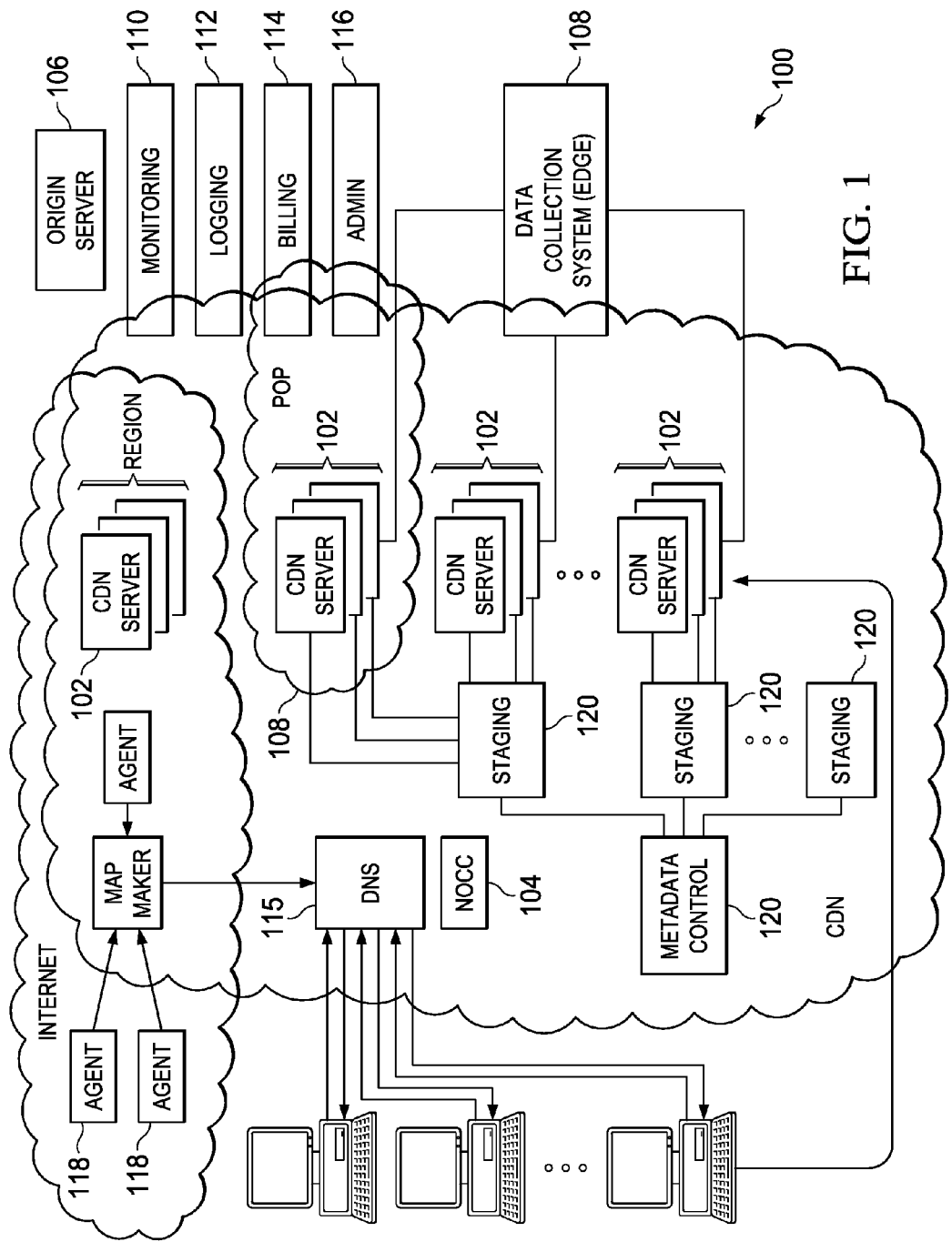
FIG. 1 is a block diagram illustrating a known distributed computer system configured as a content delivery network (CDN)

FIG. 1 illustrates a known distributed computer system that (as described below) is extended by the techniques herein to provide a single HTTP-based platform.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other backend systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
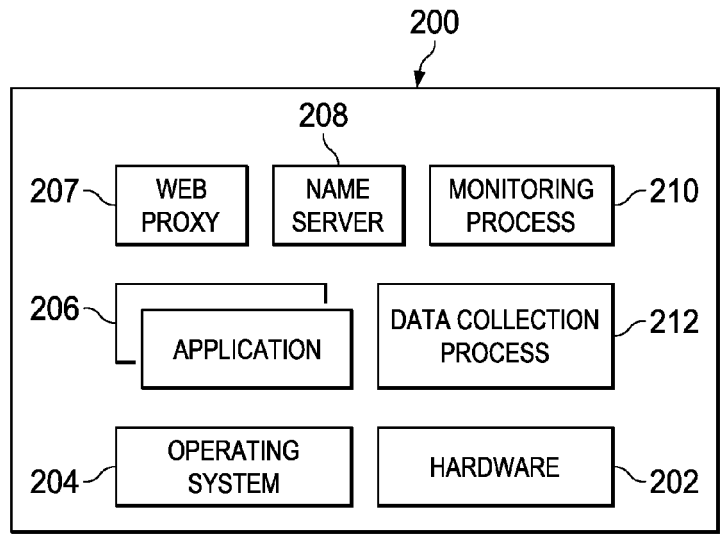
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat.

No. 7,111,057 illustrates a useful infrastructure for delivering and managing edge server content control information, and this and other edge server control information can be provisioned by the CDN service provider itself, or (via an extranet or the like) the content provider customer who operates the origin server.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

As additional background, the techniques described in U.S. Pat. Nos. 6,820,133 and 7,660,296 may be used to facilitate packet delivery between edge and forward proxies in an overlay network such as shown in FIG. 1.

Figure 3:
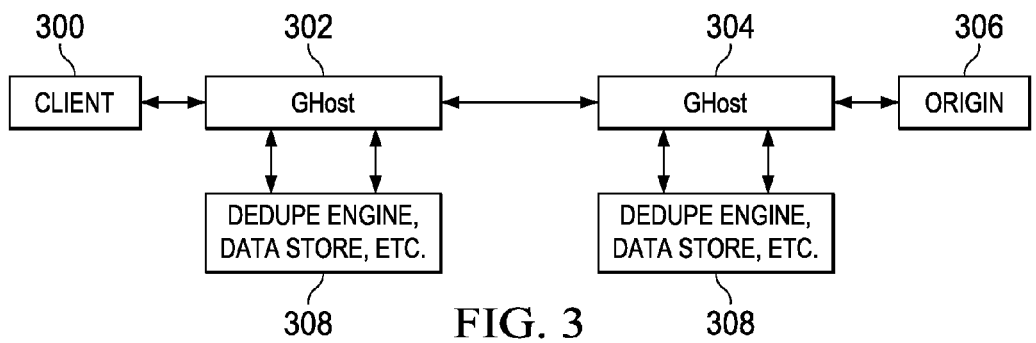
FIG. 3 is a representative wide area network (WAN) representative architecture for implementing the data differencing approach of this disclosure.

Host/Path-based De-duplication Using a Restorative Compression and Differencing Engine A representative architecture for implementing the approach of this disclosure is now shown in FIG. 3. For simplicity, a client 300 is shown interacting with an edge GHost process 302, which in turn communicates (typically over a wide area network of (WAN)) with a forward GHost process 304 located near a tenant origin 306. As will be described, each GHost process has associated therewith a de-duplication engine 308, an associated data store for a dictionary, and other related processes. Collectively, these elements are sometimes referred to as a de-duplication (or "de-dupe") module. The GHost http proxy communicates with the de-duplication module over an interface. In an alternative embodiment, the de-duplication functionality is implemented in GHost natively. More generally, GHost may be any configurable http proxy.

Figure 4:
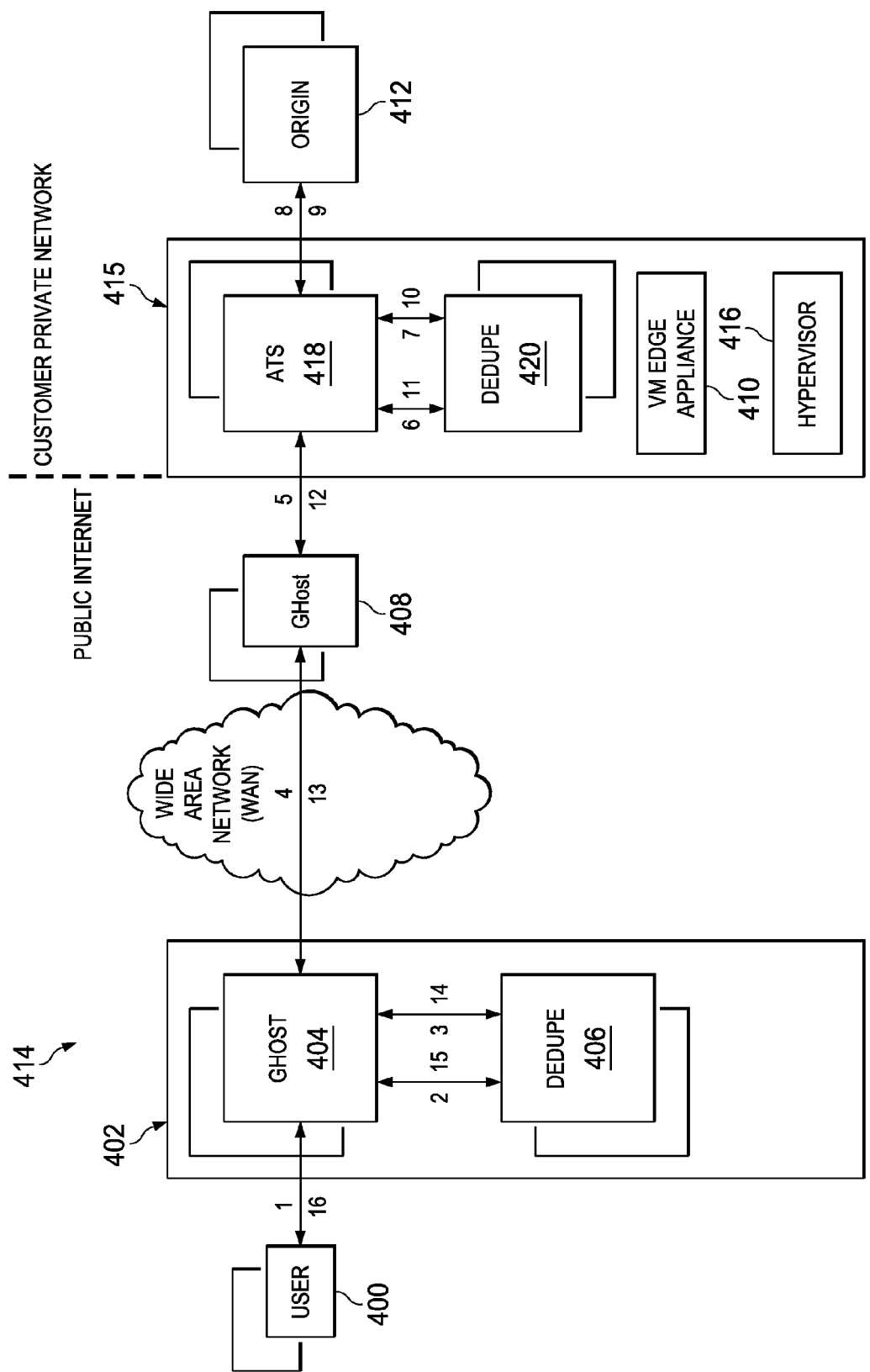
FIG. 4 is a more specific embodiment implemented within an overlay network and a customer private network.

A more specific embodiment is shown in FIG. 4. In this scenario, an end user 400 has been associated with an edge server machine 402 via overlay network DNS in the usual manner. An "end user" is a web browser user agent executing on a client machine (e.g., desktop, laptop, mobile device, tablet computer, or the like) or mobile application (app) executing on such a device. An "end user" communicates with the edge server machine via HTTP or HTTPS, and such communications may traverse other networks, systems, and devices. Edge server machine executes a metadata-configurable web proxy process (GHost) 404 managed by the overlay network provider, and an associated de-duplication process referred to as Arcade 406 (for "restorative compression and differencing engine"). As will be described, the Arcade process performs data compression for like files (version changes) within a same host and path (URI). The edge server machine 402 may be a "child" to one or more "parent" nodes, such as a parent GHost process 408 executing on another overlay server appliance (not shown). In this example, GHost process 408 is a "pass-through" and does not provide differencing functionality; it may be omitted.

The "Arcade" acronym is used herein merely for exemplary purposes, and it should not be construed to refer (or be limited) to any particular product or service.

As also seen in FIG. 4, requests from the client side are directed to an "origin" server 412. The origin (or target) server 412 is a server that typically executes in an overlay network customer infrastructure (or perhaps some other hosted environment, such as a third party cloud-based infrastructure). Typically, origin server 412 provides a web-based front-end to a web site or web-accessible customer application that is desired to be accelerated using the overlay network infrastructure. In this example scenario, the origin server 412 executes in the customer's own private network 414. Customer private network 414 includes a physical machine 415. That machine (or some other machine in the customer network) supports another web proxy process 418, and an associated Arcade process 420. Web proxy 418 need not be metadata-configurable, nor does it need to be managed actively by the overlay network.

The following is a description of an end-to-end flow. In this scenario, and as noted above, "GHost" refers to a metadata-configurable web proxy process executing on an edge appliance in an overlay network, "ATS" refers to an overlay network web proxy process executing on an appliance within a customer network or infrastructure but distinct from the overlay network, and "Arcade" refers to a compression and differencing engine process that performs data compression for like files (version changes) within the same host and path. In this embodiment, a GHost (or ATS) process as the case may be communicates with an associated Arcade process via an interface (e.g., localhost).

As will be described, Arcade is the process that handles web de-duplication. It runs at or near the origin and at the edge closest to the end user and maintains object dictionaries between those two opposite ends. Whenever requested objects flow through one end, Arcade replaces the object data with pointers into the object dictionary. On the other end of the connection, when the data arrives, that Arcade process reassembles the data using the same object dictionary. As the object dictionary references are much smaller than the data they replace, the object ends up being reduced (or compressed) greatly. Arcade can handle objects of all types and sizes. As illustrated, and for Arcade to provide a maximum performance benefit, proximity to a customer's origin infrastructure is desirable. In a representative implementation as shown in FIG. 4, the overlay network provider provides software that runs within a customer's infrastructure (the private network), e.g., as a virtual machine (VM) or "edge appliance." The edge appliance 410 preferably is located either in the DMZ or behind an enterprise firewall and it may execute on a hypervisor (e.g., VMware ESXi (v. 4.0+)) 416 supported and managed by the overlay network customer. In one preferred embodiment, the edge appliance is distributed as a 64-bit virtual appliance downloaded via an overlay network customer portal (extranet). Each edge appliance requires at least one publically routable IP address and may be configured by the overlay network, preferably over a secure connection.

As additional background, the following describes the concept of a dictionary cache. The term "dictionary" is used for descriptive purposes. In HTTP, responses fit generally into two categories: those that can be cached and used as responses to subsequent requests, and those that cannot be cached. As will be described below, these cached items are stored in an "object cache." In other words, the object cache contains objects that may be served directly in response to a request (given the correct conditions: proper URL, matching metadata (e.g., edge server content handling instructions), non-overriding no-store requests from the client, and so forth).

According to this disclosure, a separate (distinct and independent) cache called the "dictionary cache" also is used. This cache comprises what should generally be viewed as opaque data that is used simply to help compress other data. The data in this cache is not served directly in response to a request. It is "helper data" only. Preferably, complete response objects are stored in this cache; however, once the response is placed into this cache, it is treated as opaque data that is not suitable for sending back in a response directly. In addition, this cache is not limited to prior versions of a document. This approach allows storage of dynamic content that is marked as "no-store." Preferably, this content is not delivered in response to a request but is simply used to help compress real, live non-cached responses. This allows the system to accelerate dynamic content without posing a risk of returning cached versions.

In the approach of this disclosure, the objects in the dictionaries are at the granularity of files and, in particular, files that are retrievable at a host/path. In particular, and as will be described, the approach is used for version changes within a same host/path. The dictionary cache on the client (receiving) side includes fingerprints and associated data corresponding to each version of an object that it has seen. The dictionary cache on the server (sending) side includes fingerprints and associated data corresponding to each version of the object that it has delivered. While the dictionary cache on the server side may have fingerprints that are not present in the client-side dictionary cache, and vice versa, at least one fingerprint in the client-side dictionary cache must be present in the server-side dictionary cache for the technique to work; to the extent there are one or more common fingerprints in the dictionary caches, the dictionaries are said to be "shared" or synchronized.

Typically, a fingerprint is a hash of the version. A hash of a version is a result of applying a hashing function (e.g., SHA-1, MD-5, or the like) to the version contents. When a client request for a new version is received (and needs to be forwarded on toward the server side for handling), the Arcade process associated with the client side includes in the forward request each of its fingerprints (corresponding to the versions it has). Then, when the Arcade process on the server side receives those fingerprints, it checks its dictionary cache to determine which one of the fingerprints transmitted might be a match for the request. Typically, a "most recent" version will be selected, based on the assumption that the most recent version is likely to have the smallest number of changes (from prior version(s)). The use of the most recent version, however, is not a limitation. The Arcade process on the server then fetches the requested new version from the origin, performs data differencing (of the requested new version with respect to the version selected as the match) to generate a difference (DIFF). The Arcade process on the server generates a fingerprint for the requested new version and stores it in its dictionary cache (associated and along with the data itself). The Arcade process on the sending side returns a response data stream with the compressed data (the DIFF), along with a response header that includes an identification of the fingerprint of the version that was used (out of the initial selection from the ones received from the client side) to do the differencing. The Arcade process on the receiving side then uses the fingerprint to apply the DIFF against the corresponding version (which is already present on the client side) to re-create the requested version, which is then returned to the requesting client. The Arcade process on the receiving side also generates a fingerprint of the requested new version and stores that new fingerprint in its own dictionary cache (associated and along with the data itself) so that the dictionaries remain synchronized.

With the above as background, the end-to-end process flow is now described in a use case wherein an end user (having been associated to the GHost process using DNS in the usual manner, as described above) makes a request for a resource, namely, a version that is not then present in the edge-side GHost proxy.

The processing begins at step (1) when the client requests a URL for a specific host through GHost. The URL corresponds to a resource for which the system may have one or more versions stored in the dictionary cache; these one or more versions are assumed to have been received at the client previously (and are sometimes referred to as "prior versions"). At step (2), GHost checks its metadata configuration. The metadata instructs ghost to go to Arcade. To this end, GHost establishes a connection to localhost on a configured Arcade port and sends the request forward through to Arcade (using standard HTTP). GHost also adds in some headers internally that will be removed later after step (3). These headers include: a first header, which identifies whether the request came in on SSL and a second header, which identifies the port that was contacted when the request came in. At step (3), Arcade adds a special header of its own, referred to herein as a third header, which contains Arcade "fingerprints," which is data used in performing the data differencing. Arcade then establishes a new connection back to GHost on localhost on port 80 and forwards the request on through. At step (4), GHost removes the first and second headers that were added in step (2) and forwards the request onto either an upstream tier (as shown) or directly to the origin, preferably using HTTPS. If directly to the origin, step (4) is skipped and processing continues at the connection to ATS (step (5)).

At step (5), the (one or possibly more) parent GHosts pass the request on through, but preferably do not attempt to resend the request into their own localhost Arcade. They forward the request to the designated forward origin server, which in this example case is situated within a customer private network where another web proxy (ATS) awaits. At step (6), the ATS web proxy receives the request over HTTPS and forwards it to its local Arcade process via a new TCP connection to localhost on the configured Arcade port exactly like GHost did in step (2) using HTTP. At step (7), Arcade checks to see if it has the fingerprint(s) indicated in the header added back in step (3). It makes note of what fingerprint it had (or none if there were none available), and it removes the third header. It then connects back to ATS on localhost on port 80 and forwards the request via HTTP. At step (8), ATS receives the request, connects to the origin using HTTP or HTTPS (whichever the origin is configured to use), and forwards the request on. The processing then continues at step (9) with the origin responding with the data. At step (10), ATS responds back to Arcade with the data.

At step (11), Arcade performs differencing on the data, preferably compressing it into a form unsuitable for any other process other than the peer Arcade on the user/edge GHost side. It then responds with this compressed differenced data back to ATS along with a new response (the third) header that indicates the fingerprint it used out of the initial selection to do the differencing. At step (12), ATS responds back to the parent GHost if any. Preferably, the parent GHost does not cache this data. The flow then continues at step (13), with the parent GHost responding back to the edge GHost with the data. Preferably, the edge GHost does not cache this data either. At step (14), the edge GHost responds back to Arcade with this data. At step (15), the Arcade process uses the fingerprint indicated in the response (third) header to then perform decompressing of the differenced data that it is receiving. In particular, it removes the response (third) header and responds with the now uncompressed data back to Ghost. At step (16), GHost receives this response, caching it if configured to do so, and returns it back to the user to complete the process.

The following metadata configurations facilitate the above-described operation. With respect to step (1) to (2), Arcade is enabled for any file type that is not a common compressed format. HTTP range requests should be disabled and undone. At step (3) to (4), the only metadata that should execute is that which enables or controls what server or tiered parent should be at a next hop. As described, responses should not be cached here, and connections should occur over HTTPS. At step (4)-(5), any normal metadata should run as usual in this stage with the exception of caching; responses should not be cached here. At step (12) to (13), like step (4) to (5), response metadata is free to execute here with the exception of caching, which should be overwritten to do a bypass instead of any type of store. At step (13) to (14), response metadata should not execute and caching should be overwritten to do a bypass instead of any type of store. Also, decompression of any GZIP'd content encoded data should occur here. At step (15) to (16), response metadata is free to execute as normal with no modifications; caching should be performed as configured and compression of the data should be performed as it normally would have.

The differencing technique enables the client to communicate to the server that it supports data differencing along with identifying which dictionaries it currently has. This communication does not cause servers that do not support data differencing to fail. The server also is able to indicate in a response that it has applied data differencing (including what method it used to do so), and to indicate which dictionary it has used. Preferably, both the client and server support streaming of data differencing chunks when sending the entire output in one chunk is unfeasible. The protocol works seamlessly with current HTTP 1.1 semantics. Moreover, transparent proxies that are in-between two data differencing-aware endpoints (but which themselves are not data differencing-aware) do not break or cache incorrect items. Further, range requests continue to function correctly, even when data differences are applied to them.

Preferably, data differencing is only applied to like content encodings. If two versions of a cached resource exist but have different content encodings, they are not differenced. Preferably, and when given a choice, data differencing is not used on files that are already compressed (e.g., via GZIP or the like) or that do not lend themselves to data differencing (e.g., JPEG, MPEG, or the like), but rather is used only on "identity" content encodings. In addition, small files may not benefit from the process given the extra CPU resources that are required. To synchronize shared dictionary file state for operations, preferably nodes decode a given content encoding but do not encode one. In other words, assume that a client machine has version 0 of a file in "identity" content encoding, and that the server has the same dictionary in the same format. These two dictionaries in their current state are completely synchronized (in other words, all octets are equal between them; they are exact copies). Now, assume that the client attempts to download a subsequent version 1 of the file, which the origin server delivers in "gzip" content encoding. In this scenario, an intermediary should decode the content encoding back to "identity."

According to the techniques described herein, the overlay service provider removes redundant data it is sending between peers on the network, instead sending much smaller fingerprints. The Arcade engine requires that a requesting (typically downstream) peer keep track of a number of versions of content in its internal cache, keying them by host and path, and then telling an upstream peer what the fingerprints are for those versions on every request. The upstream peer then selects from the offered choices a best version that it too shares in its cache, using it to perform binary differencing (binary delta) on the new data. Thus, the approach herein enables compression to occur for like files (version changes) within the same host and path.

The following provides additional details regarding the protocol implemented by the compression and differencing engine. For convenience, this protocol is sometimes referred to as the Arcade HTTP protocol.

Preferably, when a client requests a resource from a differencing server for which it does not have a prior cached version, the client indicates its willingness to participate in the Arcade HTTP protocol by sending a single HTTP header, such as: (third header): willing. This header indicates to the upstream server that the client is willing to accept dictionary cache entries for a particular host/URI combination, but that it does not yet have any shared dictionaries of its own. If the client does have a prior version of the resource that it wishes to have server apply compression using a particular method or methods, it sends the following header: (third header): m1, m2, . . . m; fp1, fp2, . . . , fpm, where m* are of type METHOD_STRING and fp* are of type FINGERPRINT_STRING. The various methods list out the differencing methods that this client supports. The various fingerprints represent the fingerprints of preset dictionaries (prior content) that this client has stored. Additionally, if the third header is present with fingerprints, the meaning of the normal HTTP Accept-Encoding header changes to mean that the client accepts content encodings from (an identified list) as well as data differences of those encodings. Thus, consider an HTTP GET request such as: GET/foo.html HTTP 1.1, Host: www- .bar.com, Accept-Encoding: gzip, baz (third header); m; (HASH_STRING). This request states that the client supports the requested resource (foo.html) being returned in the following "formats": gzip format with no data differencing, baz format with no data differencing, identity format with no data differencing (identity is implicit in Accept-Encoding), gzip format data differencing performed after the compression, baz format with data differencing performed after the compression, and identity format with data differencing.

The response header returned from a server in response to any differencing request preferably takes the form: (third header); m; store_mode; hash; fp1, fp2, ... fpn, where m is a METHOD_STRING and indicates the method used to perform the differencing. If no differencing was performed, the method is "nop." If differencing was performed, the method must match one of the methods given in the request. The store_mode is a BOOL_STRING and indicates whether the client may use the expanded data as a dictionary. It is assumed that the server will allow the client to use most items as a dictionary; this allows controls in those instances where it will not (which may be useful for partial responses such as range requests and true no-store). The hash is a HASH_STRING and is present if the method is not a "nop." It indicates the hashing algorithm used to compute the hash of the source chunks, as described below. An example hash is SHA-1. The fp* are of type FINGERPRINT_STRING and indicate the preset dictionary or combination of dictionaries (prior content) that was actually used in the differencing. Preferably, if there are multiple fingerprints listed in the response, the client combines the dictionaries represented by the given fingerprints in the order listed and uses the resultant data as the preset dictionary. Preferably, the combination method is by simple concatenation. In the response, the "Content-Encoding" header indicates the encoding that results from reversing the data difference, if any.

Figure 5:
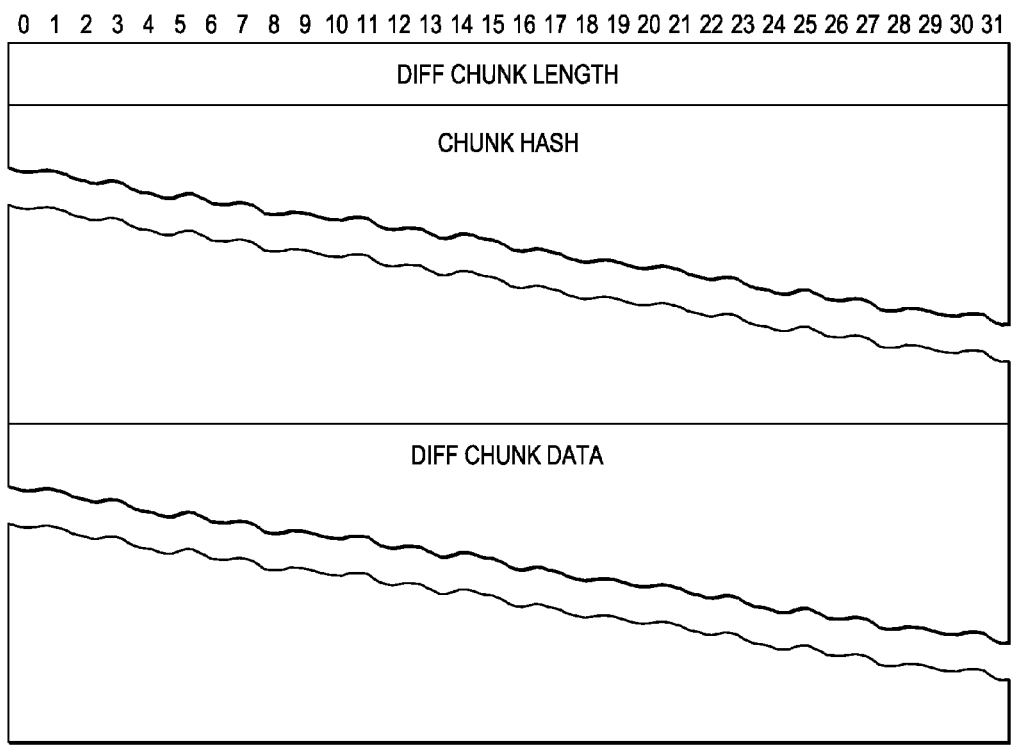
FIG. 5 is a representative format of a diff chunk according to the differencing protocol of this disclosure.
Figure 6:
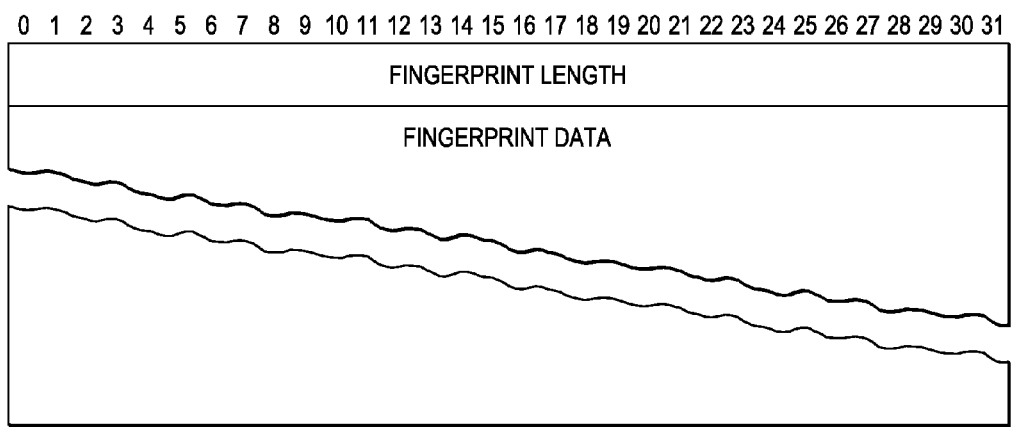
FIG. 6 is a representative format of a fingerprint chunk according to the protocol.

Preferably, the data portion of the data difference is encoded to support chunking. A chunk means a block of a target file. Depending on the differencing algorithm used, each block may have a header. Thus, preferably a block is an atomic unit that is passed through the differencing recombination algorithm as if it were a standalone file. FIG. 5 illustrates a representative chunk format. In this format, DIFF Chunk Length is of LENGTH_TYPE and specifies the size of the Diff Chunk Data portion. Chunk Hash is the hash of the chunk's data once the data differencing has been reversed. This is used to verify integrity, especially that of the dictionary. If there is a collision in the fingerprint of the dictionary or combination of dictionaries, or if the dictionary data gets corrupted, this hash would compute to a different value on the client that it did on the server. As such, the client should immediately sever the connection, purge its matching dictionary entries, issue a log or alert, and retry the download. The hash is computed using the HASH_STRING in the hash field of the third header. Following the Chunk Hash is the Chunked Data itself. Preferably, padding is not used to reduce the number of bytes on the wire. To indicate that the stream of chunks is finished, a Diff Chunk Length of zero is sent to mark the "end of stream" with no following Chunk Hash or Diff Chunk Data. If the X-Arcade header protocol header indicates that this could be stored as a dictionary on the client, a single fingerprint record follows, such as shown in FIG. 6. The client must use the fingerprint noted when referencing the dictionary.

In standard HTTP 1.1, Range Requests and responses are tied to a specific Content-Encoding. Thus, for example, if the response is of content encoding "gzip" with a range of 103 to 507, then those bytes represent 103 to 507 *in the gzip data*, not the original variant. According to the protocol of this disclosure, if the differencing server receives a range request, it passes the Accept-Encoding forward to the upstream origin server untouched. As a result, when the differencing server gets the range data back, it is not able to decode it back to "identity" content encoding if it is not already there. Thus, to ensure that data differencing is only applied to like content encodings, the requested dictionary must have the same Content-Encoding as the range response or the range response must be of content encoding "identity" and the dictionary must be decodable back to "identity" as well. To discourage transparent proxies that are not aware of the Arcade HTTP protocol extensions (as described herein) from caching the data differencing responses, the approach defined in RFC 3229 is used. Thus, when the server successfully performs data differencing on a response, it sets the status code to an unregistered value with an appropriate reason code. Additionally, for the reasons specified in RFC 3229, a cache control token (e.g. called "arc") may be used. For all responses other than those with a "Cache-Control" header of "no-store", "no-store, arc" is prepended to the "Cache-Control" header (or if the header is not present, it is created). This causes all transparent proxies that do not understand the protocol extensions described herein to reject caching of the item due to the no-store. However, proxies that understand the protocol will ignore the "no-store" when an "arc" is present. Finally, the client that reverses the data differencing is responsible for removing the "no-store" and "arc" cache control modifiers if "arc" is present in the "Cache-Control" header.

The Arcade function may be implemented in a daemon process, namely, as a set of computer program instructions executed by a hardware processor. The daemon may function as both the client and the server in the Arcade HTTP protocol described above. Preferably, it is shunted into or onto the servers (e.g., GHost) at the ends of a high latency leg of communication within an overlay network. As described above, preferably metadata configuration data determines whether a particular request (on the sending side of the connection) should be considered a request that should be accelerated using the protocol. If so, and as has been described, the Arcade daemon (on the sending side) receives the request and looks up what dictionaries (if any) it has that can be used for the host+URI combination. It adds in the appropriate headers and then connects back to GHost (on the sending side) to issue the request. Connecting back through GHost (instead of going forward directly) is preferred (but not necessarily required) to take advantage of GHost-to-Ghost (G2G) performance optimizations that may be in place (e.g., persistent connections or the like). In the example scenario in FIG. 4, GHost then forwards the request over the wire to the upstream machine, which is fronted by the ATS process serving the correct certificates for the SSL connection. Without limitation, ATS refers to Traffic Server HTTP proxy, which is available as open source. The Arcade process running on the forward side makes note of the dictionaries supported and forwards the request internally (if on the same machine) to the ATS proxy after removing the Arcade HTTP protocol extensions. It does this instead of going directly to the origin as ATS may already have the data cached and can return it locally, thus providing additional offload from the origin server. ATS checks to see if it has cached data that matches the request and, if so, sends it back to the Arcade daemon. If not, it forwards the request to the origin, receives the data, and then sends it back to the Arcade daemon. The Arcade daemon differences the data with the requested dictionary and sends the response back to the originating request in ATS. ATS then sends the data (e.g., over a TCP-optimized connection) back to the GHost process that sent it. The Arcade daemon on the sending side decodes the data and returns it to GHost. To the sending GHost, this effectively looks like the response came directly from the origin server because it is fully decoded. GHost caches as necessary and delivers the response back to the client.

Variants

The techniques herein may be used to support SDCH-style shared dictionaries. To do this, another header is added in responses. The format enables the downstream proxy to forcibly store items into an LRU cache for different URIs on the fly. The protocol for the request and response otherwise would remain unchanged (a client issues a request to a server with the supported dictionary fingerprints which now included shared dictionaries as well, and the server responds with the dictionaries it used).

Dictionaries may be pre-loaded. If prior objects for a given request do not exist, preloaded dictionaries based on the file's type may be used. For example, if a client attempts to download a .PPT slide presentation and the Arcade daemon currently does not have a prior version of the data, it could instead use a generic preloaded .PPT file to try to get a best effort compression on its first access. Subsequent downloads would then use the prior version as a dictionary instead of the base preloaded file.

The techniques herein may be used with other protocols that are heavily object driven like CIFS.

Another extension is expanding image data on-the-fly. Today, most images on the web are in a highly-compressed format, which makes performing data differencing very difficult. There are sites, however, where the differences between images at the pixel level make them ideal candidates for data differencing. Background coloring of the image, outlines, and text is often identical. These images may be expanded in memory into their native pixel format, thus enabling differencing of that data. The results are then compressed and sent.

As used herein, the following terms have the following meanings:

The term "diff" means a set of instructions for transforming a source document into a target document.

The term "data differencing" refers to the act of utilizing shared dictionaries between a client and server to increase the amount of compression that can be applied to a response.

The term "dictionary" refers to a set of sequences that can be used in compression as targets for back references.

The term "back reference" refers to an offset and length tuple into a dictionary representing a reference to a sequence of data.

A "dictionary cache" is a cache containing sets of opaque data that must only be used to help compress real responses. As noted above, this data is not sent directly from the dictionary cache in a response; it is only used to assist in compression/differencing.

A "differencing server" is a server that performs the data differencing operation.

A "preset dictionary" is a dictionary that is specified other than by a sliding window or discovered discovery. In this disclosure, the shared dictionary is a type of preset dictionary. A dictionary of this type is fed to the differencing algorithm prior to running over the source data.

The term "compression" refers to the act of shrinking data.

A "fingerprint" is a binary compressed representation of a string of data, such as a file. Typically, a fingerprint is a hash with good cryptographic properties, such as SHA-1.

The approach described herein enables the overlay servers to remove redundant data it is sending between peers on the network, instead sending much smaller fingerprints. This reduces the overall size of the data on the wire drastically for transactions that have high amounts of duplicate data, thus reducing the amount of time for delivery to the end user. In addition, the reduced data results in lowered operating costs on the network as the amount of information transferred and the bandwidth requires decreases.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. Apparatus operative in a receiving peer entity of an overlay network, comprising:
   a processor;
   a dictionary comprising, for a piece of content associated with a host/path, one or more versions of the piece of content and, for each version, a fingerprint;
   an HTTP proxy;

computer memory holding program code executed by the processor to perform data differencing between the receiving peer entity and a sending peer entity of the overlay network, the program code comprising:

program code operative to receive from the HTTP proxy a request for a new version of the piece of content that is not available at the HTTP proxy, to associate with the request one or more fingerprints corresponding to the one or more versions of the piece of content in the dictionary, and to return to the HTTP proxy, for delivery forward towards an origin server, a modified request that includes the one or more fingerprints; and program code operative to receive from the HTTP proxy a data stream, the data stream having been received by the HTTP proxy in response to the modified request, the data stream including data representing a difference between the new version of the piece of content and that version of the piece of content represented by a given one of the one or more fingerprints that was included in the modified request, the data stream also including an identification of the given one of the one or more fingerprints, to generate the new version of the piece of content from the difference and the version of the piece of content represented by the given one of the fingerprints, and to return to the HTTP proxy, for delivery back to a requesting client, the new version of the piece of content so generated.

2. The apparatus as described in claim 1 wherein the data differencing is performed when the piece of content has a given content encoding.

3. The apparatus as described in claim 2 wherein the given content encoding is an identity content encoding.

4. The apparatus as described in claim 1 wherein the program code is further operative to generate and store in the dictionary a new fingerprint corresponding to the new version of the piece of content so generated.

5. The apparatus as described in claim 1 wherein the data differencing is enabled for any piece of content that is other than in a compressed format.

6. The apparatus as described in claim 1 wherein the one or more fingerprints corresponding to the one or more versions of the piece of content in the dictionary are associated with the request in an HTTP header.

7. The apparatus as described in claim 1 wherein the HTTP proxy is configurable and communicates with the program code over an interface.

8. The apparatus as described in claim 1 wherein a fingerprint is generated by hashing a version of the piece of content.

9. Apparatus operative in a sending peer entity of an overlay network, comprising:

a processor;

a dictionary comprising, for a piece of content associated with a host/path, one or more versions of the piece of content and, for each version, a fingerprint;

an HTTP proxy;

computer memory holding program code executed by the processor to perform data differencing between the sending peer entity and a receiving peer entity, the program code comprising:

program code operative to receive from the HTTP proxy a request for a new version of the piece of content, the request having been modified to include one or more fingerprints corresponding to the one or more versions of the piece of content that are then available at the receiving peer entity, and to select a given one of the one or more fingerprints, to instruct the HTTP proxy to obtain from an origin server the new version of the piece of content; and program code operative to receive from the HTTP proxy the new version of the piece of content provided by the origin server, to generate data representing a difference between the new version of the piece of content and that version of the piece of content represented by the given one of the one or more fingerprints, and to return to the HTTP proxy, for delivery to the receiving peer entity, a data stream including the differenced data and an identification of the given one of the one or more fingerprints.

10. The apparatus as described in claim 9 wherein the data differencing is performed when the piece of content has a given content encoding.

11. The apparatus as described in claim 10 wherein the given content encoding is an identity content encoding.

12. The apparatus as described in claim 9 wherein the program code is further operative to generate and store in the dictionary a new fingerprint corresponding to the new version of the piece of content provided by the origin server.

13. The apparatus as described in claim 9 wherein the data differencing is enabled for any piece of content that is other than in a compressed format.

14. The apparatus as described in claim 9 wherein the one or more fingerprints corresponding to the one or more versions of the piece of content are associated with the request in an HTTP header.

15. The apparatus as described in claim 9 wherein the HTTP proxy is configurable and communicates with the program code over an interface.

16. The apparatus as described in claim 9 wherein a fingerprint is generated by hashing a version of the piece of content.

17. A data differencing system, comprising:

a receiving peer entity comprising a first HTTP proxy, comprising:

a first dictionary comprising, for a piece of content associated with a host/path, one or more versions of the piece of content and, for each version, a fingerprint;

processor-executed program code operative to receive from the first HTTP proxy a request for a new version of the piece of content that is not available at the first HTTP proxy, to associate with the request one or more fingerprints corresponding to the one or more versions of the piece of content in the first dictionary, and to return to the first HTTP proxy, for delivery forward towards an origin server, a modified request that includes the one or more fingerprints;

a sending peer entity including a second HTTP proxy, comprising:

a second dictionary comprising, for a piece of content associated with a host/path, one or more versions of the piece of content and, for each version, a fingerprint;

processor-executed program code operative to receive from the second HTTP proxy the modified request, to select a given one of the one or more fingerprints, and to instruct the second HTTP proxy to obtain from an origin server the new version of the piece of content; and processor-executed program code operative to receive from the second HTTP proxy the new version of the piece of content provided by the origin server, to generate data representing a difference between the new version of the piece of content and that version of the piece of content represented by the given one of the one or more fingerprints, and to return to the second HTTP proxy, for delivery to the receiving peer entity, a data stream including the data and an identification of the given one of the one or more fingerprints;

the receiving peer entity further including processor-executed program code operative to receive from the first HTTP proxy the data stream, to generate the new version of the piece of content from the data representing the difference and the version of the piece of content represented by the given one of the fingerprints, and to return to the first HTTP proxy, for delivery back to a requesting client, the new version of the piece of content so generated.

* * * * *